United States Patent
Tsuchiya et al.

(10) Patent No.: US 10,784,052 B2
(45) Date of Patent: Sep. 22, 2020

(54) ELECTRIC STORAGE MODULE

(71) Applicant: TAIYO YUDEN CO., LTD., Chuo-ku, Tokyo (JP)

(72) Inventors: Takayuki Tsuchiya, Takasaki (JP); Shinji Ishii, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 196 days.

(21) Appl. No.: 16/138,471

(22) Filed: Sep. 21, 2018

(65) Prior Publication Data

US 2019/0096591 A1    Mar. 28, 2019

(30) Foreign Application Priority Data

Sep. 27, 2017 (JP) ................. 2017-185703

(51) Int. Cl.
| | |
|---|---|
| *H01M 2/00* | (2006.01) |
| *H01G 11/12* | (2013.01) |
| *H01M 2/10* | (2006.01) |
| *H01G 11/82* | (2013.01) |
| *H01G 11/80* | (2013.01) |
| *H01M 10/42* | (2006.01) |
| *H01M 2/02* | (2006.01) |
| *H01M 2/12* | (2006.01) |
| *H01M 10/04* | (2006.01) |
| *H01M 10/0525* | (2010.01) |
| *H01M 10/52* | (2006.01) |
| *H01M 10/54* | (2006.01) |

(52) U.S. Cl.
CPC ............ *H01G 11/12* (2013.01); *H01G 11/80* (2013.01); *H01G 11/82* (2013.01); *H01M 2/0212* (2013.01); *H01M 2/1016* (2013.01); *H01M 2/1241* (2013.01); *H01M 10/0463* (2013.01); *H01M 10/42* (2013.01); *H01M 10/0525* (2013.01); *H01M 10/52* (2013.01); *H01M 10/54* (2013.01)

(58) Field of Classification Search
CPC ............ H01M 2/0212; H01M 2/1016; H01M 2/1241; H01M 10/0463; H01M 10/42; H01M 10/52; H01M 10/052; H01M 10/0525; H01M 10/54; H01G 11/12; H01G 11/80; H01G 11/82
See application file for complete search history.

(56) References Cited

U.S. PATENT DOCUMENTS

| | | | |
|---|---|---|---|
| 9,236,587 B2 * | 1/2016 | Lee ...................... | H01M 2/1077 |
| 9,331,324 B2 * | 5/2016 | Kwak ................. | H01M 2/0473 |
| 9,515,302 B2 * | 12/2016 | Ahn .................... | H01M 2/1061 |

FOREIGN PATENT DOCUMENTS

JP    2005203262 A    7/2005

* cited by examiner

*Primary Examiner* — Raymond Alejandro
(74) *Attorney, Agent, or Firm* — Law Office of Katsuhiro Arai

(57) ABSTRACT

An electric storage module includes an electric storage cell and an enclosure, wherein the electric storage cell includes an electric storage element and an exterior body in which the electric storage element is sealed; the enclosure has a housing space in which the electric storage cell is housed; the enclosure has a through hole that connects the housing space and the exterior space; and the through hole is formed at a position corresponding to the part of the electric storage cell where the electric storage element does not exist.

5 Claims, 7 Drawing Sheets

ELECTRIC STORAGE MODULE

BACKGROUND

Field of the Invention

The present invention relates to an electric storage module with built-in electric storage cells.

Description of the Related Art

Electric storage cells such as lithium ion capacitors are often housed in an enclosure for use as an electric storage module. However, electric storage cells generate gas inside as a result of external short-circuiting or over-discharge, in which case the internal pressures of electric storage cells may rise.

Accordingly, many electric storage cells have a safety valve, so that when their internal pressure reaches or exceeds a certain level, such internal pressure is released from the safety valve (refer to Patent Literature 1, for example). In general, enclosures of electric storage cells are also designed to withstand damage, even when the electric storage cells have expanded due to their internal pressures, until the operating pressures of the safety valves are reached.

Background Art Literatures

[Patent Literature 1] Japanese Patent Laid-open No. 2005-203262

SUMMARY

Now, when disassembling an electric storage module exhibiting abnormality, no problem is anticipated so long as the safety valves are operating. However, if the internal pressures of the electric storage cells have not reached the operating pressures of the safety valves yet, it means that the module is disassembled when a stress from the expanded electric storage cells is applied to its enclosure.

In this case, the enclosure may warp and make disassembly difficult, or the members constituting the enclosure may scatter. Additionally, if a stress is applied over a long period of time, the screws, etc., may undergo fatigue failure and the electric storage cells and enclosure may be damaged.

In light of the aforementioned situations, an object of the present invention is to provide an electric storage module that allows for release of internal pressure prior to disassembly in the event of abnormality, and thus can be disassembled safely.

Any discussion of problems and solutions involved in the related art has been included in this disclosure solely for the purposes of providing a context for the present invention, and should not be taken as an admission that any or all of the discussion were known at the time the invention was made.

To achieve the aforementioned object, the electric storage module pertaining to an embodiment of the present invention comprises an electric storage cell and an enclosure.

The electric storage cell comprises an electric storage element and an exterior body in which the electric storage element is sealed.

The enclosure has a housing space in which the electric storage cell is housed.

The enclosure has a through hole that connects the housing space and the exterior space.

The through hole is formed at a position corresponding to the part of the electric storage cell where the electric storage element does not exist.

According to this constitution, a needle can be inserted into a through hole to puncture a hole in the exterior body and thereby release the internal pressure even when the internal pressure of an electric storage cell has risen to cause a stress to be applied to the enclosure. This way, the stress can be removed before the enclosure is disassembled, and therefore the electric storage module can be disassembled safely.

The exterior body may be a laminate film, the laminate film may have a sealed area which is fused along the periphery of the electric storage element and a non-sealed area between the sealed area and the electric storage element, and the through hole may be formed at a position corresponding to the non-sealed area.

The electric storage cell may have a positive-electrode tab which is connected to the positive electrodes of the electric storage element and led out from the laminate film via the non-sealed area and the sealed area, as well as a negative-electrode tab which is connected to the negative electrodes of the electric storage element and led out from the laminate film via the non-sealed area and the sealed area, and the through hole may be formed at a position corresponding to the non-sealed area between the positive-electrode tab and negative-electrode tab.

The enclosure can house a multiple number of the electric storage cells in the housing space, and the electric storage module may have multiple through holes formed at positions corresponding to the parts of the multiple electric storage cells where the electric storage elements do not exist.

The housing space may be able to house the multiple electric storage elements that have been stacked.

As described above, according to the present invention, an electric storage module can be provided that allows for release of internal pressure prior to disassembly in the event of abnormality, and thus can be disassembled safely.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DESCRIPTION OF THE SYMBOLS

100—Electric storage module
110—Enclosure
120—Electric storage cell
121—Electric storage element
122—Exterior member
122a—Sealed area
122b—Non-sealed area
123—Positive-electrode tab
124—Negative-electrode tab
125—Positive electrode
126—Negative electrode
127—Separator
130—Through hole

DETAILED DESCRIPTION OF EMBODIMENTS

The electric storage module pertaining to an embodiment of the present invention is explained.

[Constitution of Electric Storage Module]

Figure 1:
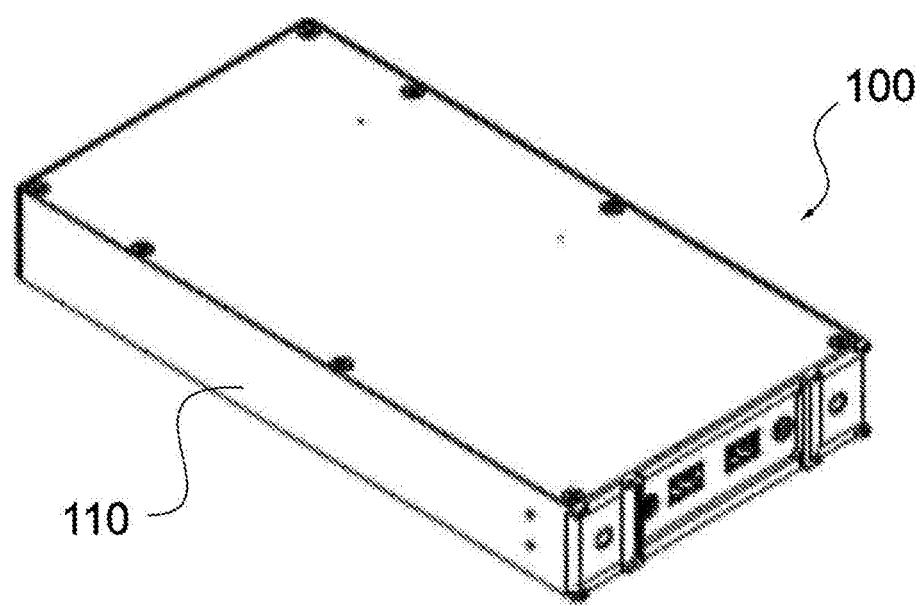
FIG. 1 is a perspective view of the electric storage module pertaining to an embodiment of the present invention.
Figure 1:
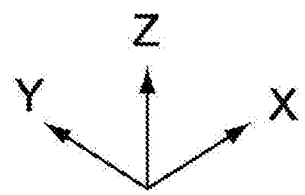
Figure 2:
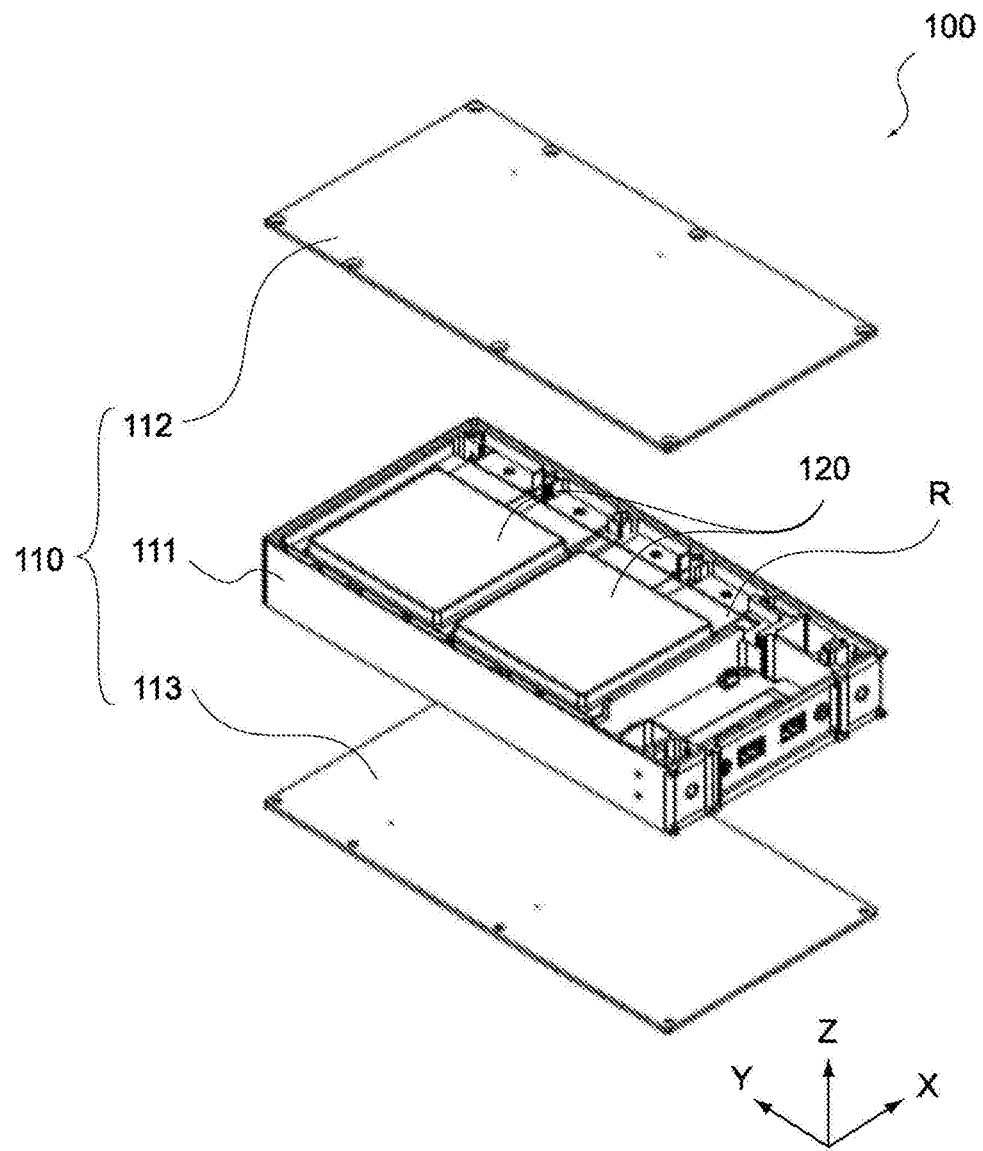
FIG. 2 is an exploded perspective view of the electric storage module.

FIG. 1 is a perspective view of the electric storage module 100 pertaining to the embodiment, while FIG. 2 is an exploded perspective view of the electric storage module 100. As shown in these figures, the electric storage module 100 comprises an enclosure 110 and electric storage cells 120. It should be noted that, in the figures below, the three directions crossing at right angles to each other represent the X direction, Y direction, and Z direction, respectively.

The enclosure 110 is constituted by a frame member 111, a first sheet member 112, and a second sheet member 113, as shown in FIG. 2.

The frame member 111 is a frame-shaped member made of synthetic resin, etc. Mounted on the frame member 111 are, for example, bus bars that are electrically connected to the positive-electrode terminals and negative-electrode terminals of the electric storage cells 120, as well as boards on which control circuit for the electric storage cells 120 are installed.

The first sheet member 112 and second sheet member 113 are sheet-shaped members made of aluminum or other metal. As the first sheet member 112 and second sheet member 113 sandwich the frame member 111, a housing space R enclosed by the frame member 111, first sheet member 112, and second sheet member 113, is formed. The first sheet member 112 and second sheet member 113 are secured to the frame member 111 with screws, etc.

The enclosure 110 is not limited to the constitution illustrated herein; instead, it may be constituted in any way so long as a housing space in which the electric storage cells 120 can be housed is formed.

Figure 3:
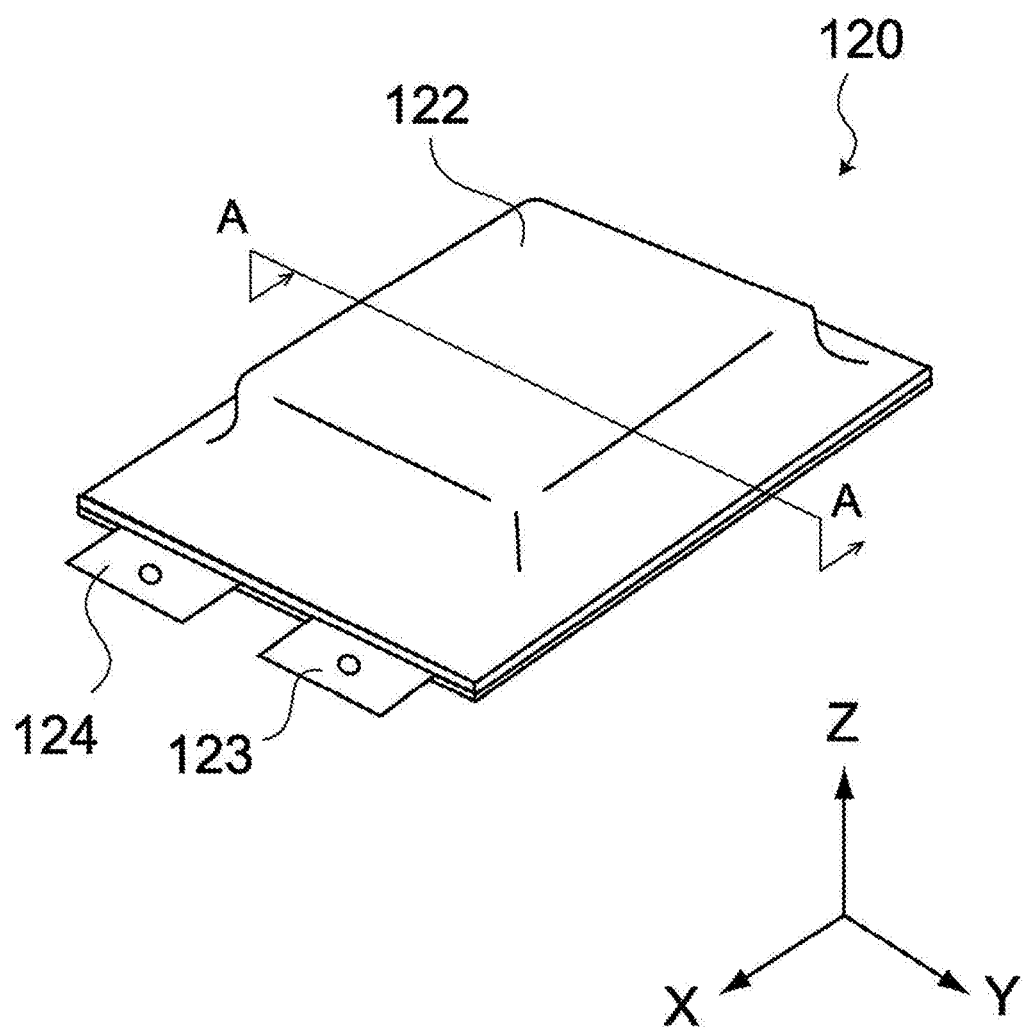
FIG. 3 is a perspective view of an electric storage cell provided in the electric storage module.
Figure 4:
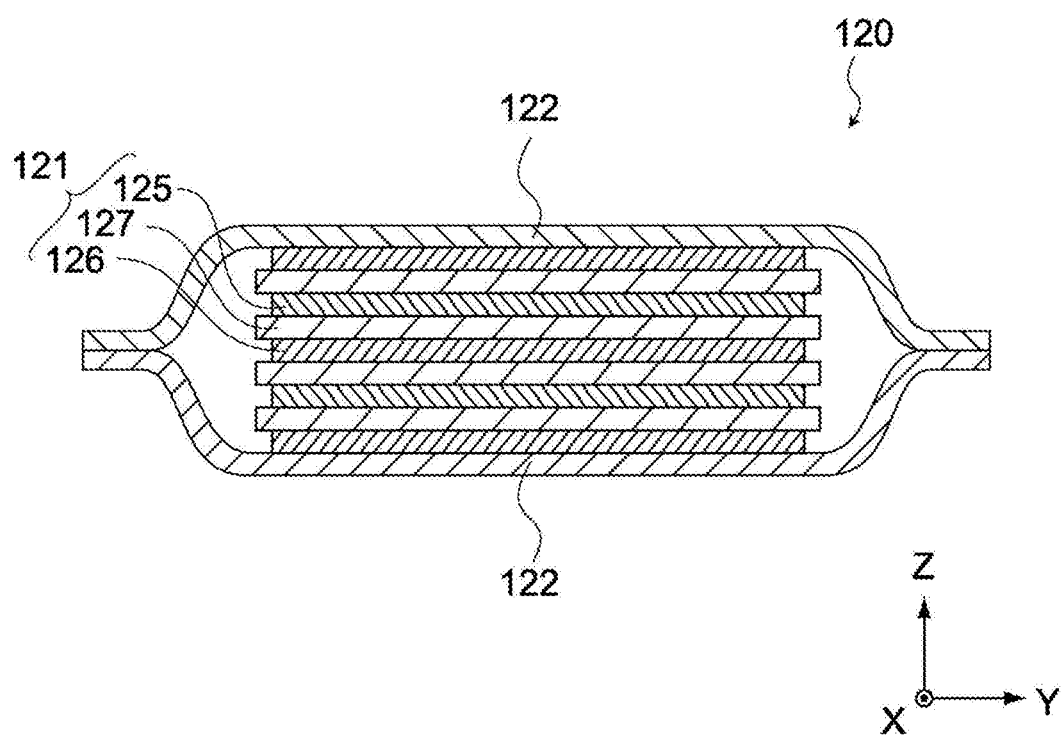
FIG. 4 is a cross-sectional view of an electric storage cell provided in the electric storage module.

The electric storage cells 120 are cells that can be charged and discharged. FIG. 3 is a perspective view of an electric storage cell 120. FIG. 4 is a cross-sectional view of an electric storage cell 120, showing a cross-section along line A-A in FIG. 3. As shown in these figures, the electric storage cell 120 has an electric storage element 121, exterior members 122, a positive-electrode tab 123, and a negative-electrode tab 124.

The electric storage element 121 is constituted by positive electrodes 125, negative electrodes 126, and separators 127 that are layered, as shown in FIG. 4.

The positive electrodes 125 are each a sheet-shaped member that contains positive-electrode material, being a current-collecting foil layered with a positive-electrode material, for example. The current-collecting foil is a porous aluminum foil, for example, and the positive-electrode material is a mixture of active carbon or other positive-electrode active material and binder resin, etc., for example.

The negative electrodes 126 are each a sheet-shaped member that contains negative-electrode material, being a current collecting foil layered with a negative-electrode material, for example. The current-collecting foil is a porous copper foil, for example, and the negative-electrode material is a mixture of graphite or other negative-electrode active material and binder resin, etc., for example.

The separators 127 are each a sheet-shaped member made of a woven fabric, non-woven fabric, synthetic microporous resin membrane, etc., insulating a positive electrode 125 and a negative electrode 126.

The positive electrodes 125 and negative electrodes 126 are layered via the separators 127 in between, to constitute the electric storage element 121. The numbers of positive electrode 125 and negative electrode 126 layers are not limited in any way. The electric storage element 121 is housed inside the exterior members 122 together with any electrolytic solution.

Figure 5:
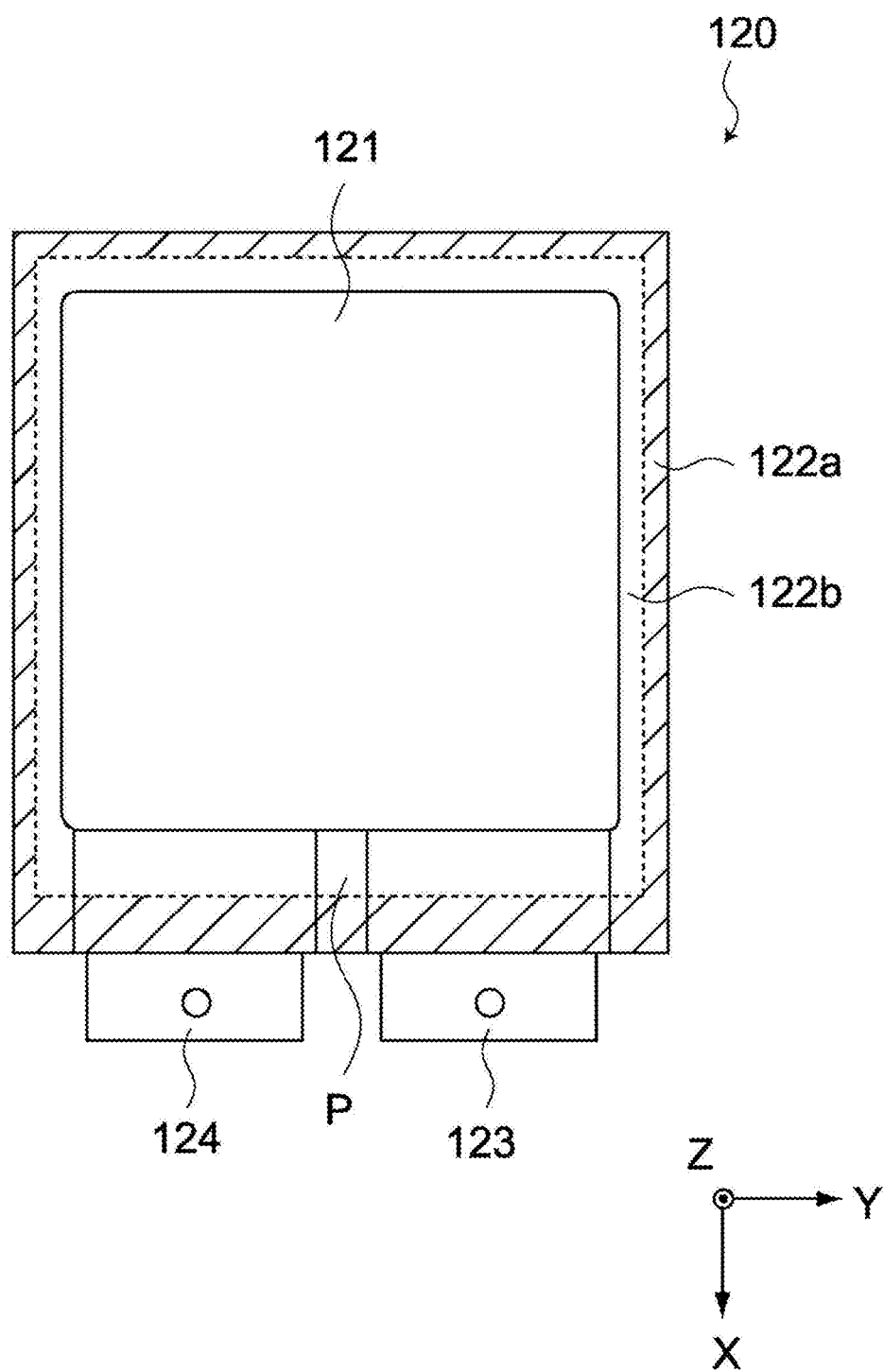
FIG. 5 is a plan view of an electric storage cell provided in the electric storage module.

The exterior members 122 seal the electric storage element 121. The exterior members 122 may each be a laminate film constituted by a metal foil whose top side and bottom side are both coated with a synthetic resin, where the synthetic resin is thermally fused along the periphery of the electric storage element 121. FIG. 5 is a plan view of the electric storage cell 120.

As shown in FIG. 5, the area where the exterior members 122 are fused represents a sealed area 122a (shaded area in the figure), while the non-fused area between the sealed area 122a and the electric storage element 121 represents a non-sealed area 122b.

It should be noted that the exterior members 122 need not be laminate films, and any members may be used so long as they can seal the electric storage element 121.

The positive-electrode tab 123 is electrically connected to the positive electrodes 125, and led out of the exterior members 122 via the non-sealed area 122b and sealed area 122a. The positive-electrode tab 123 may be a metal foil or metal sheet made of aluminum, etc.

The negative-electrode tab 124 is electrically connected to the negative electrodes 126, and led out of the exterior members 122 via the non-sealed area 122b and sealed area 122a. The negative-electrode tab 124 may be a metal foil or metal sheet made of copper, etc.

The electric storage cell 120 has the constitution described above. However, the electric storage cell 120 is not limited to the constitution illustrated herein; instead, it may be constituted as a lithium ion capacitor, lithium ion secondary battery, electrical double-layer capacitor, or the like, so long as it can be charged and discharged.

Figure 6:
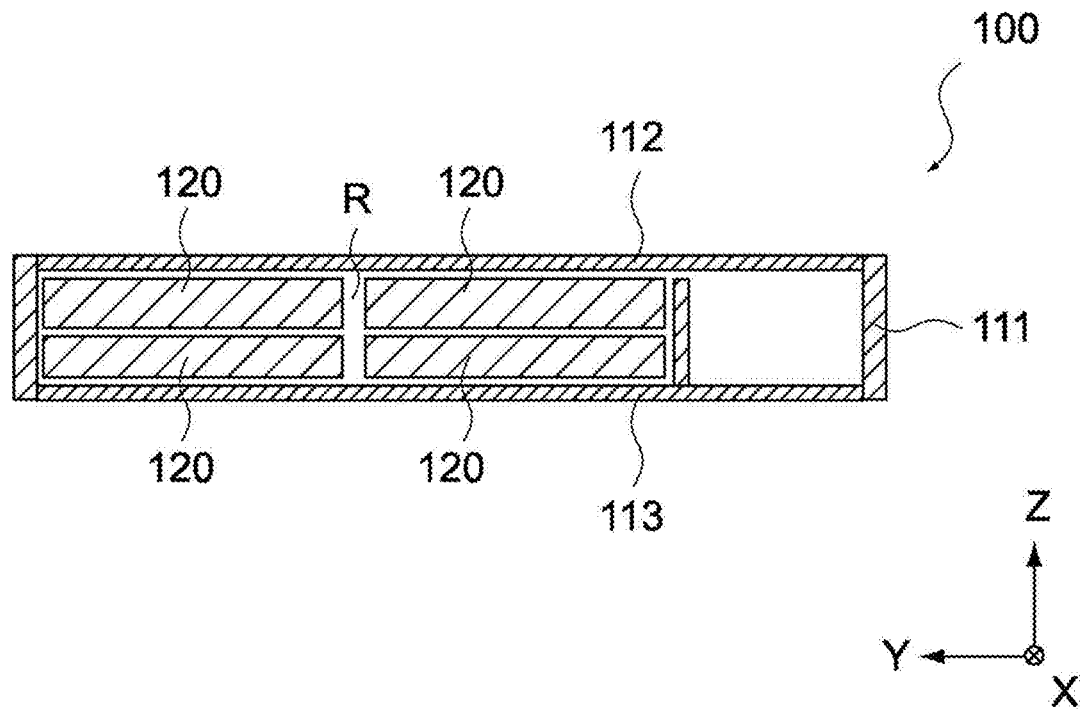
FIG. 6 is a schematic view showing the placement of electric storage cells provided in the electric storage module.

The electric storage cells 120 are housed inside the housing space R of the enclosure 110. FIG. 6 is a schematic view showing the placement of the electric storage cells 120 housed inside the housing space R. As shown in this figure, the housing space R may store two sets of electric storage cells 120, wherein one set consists of two electric storage cells 120 stacked in a thickness direction. It should be noted that the number of electric storage cells 120 that are housed inside the housing space R is not limited in any way, and only one electric storage cell 120 may be housed in it.

[Through Holes]

Figure 7:
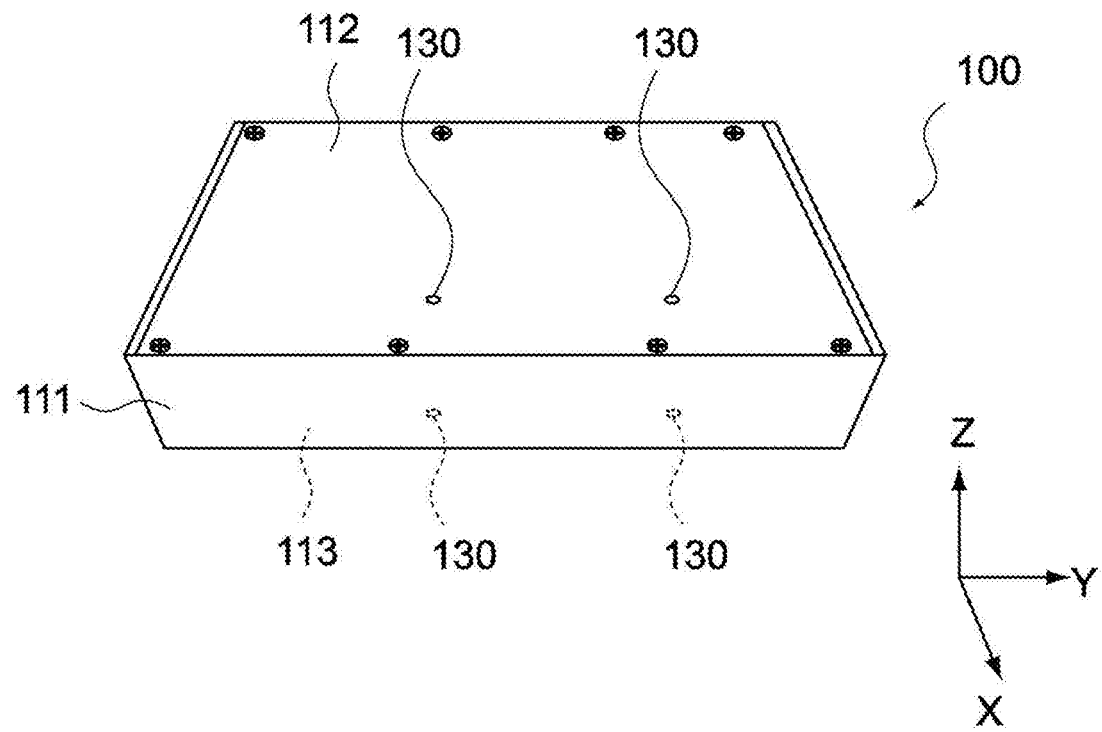
FIG. 7 is a perspective view of the electric storage module.

The first sheet member 112 and second sheet member 113 have through holes provided in them. FIG. 7 is a schematic view showing the placement of through holes 130. The through holes 130 are each a hole that penetrates the first sheet member 112 and second sheet member 113 from top to bottom. Although not limited in size in any way, these holes are around several millimeters in diameter.

Figure 8:
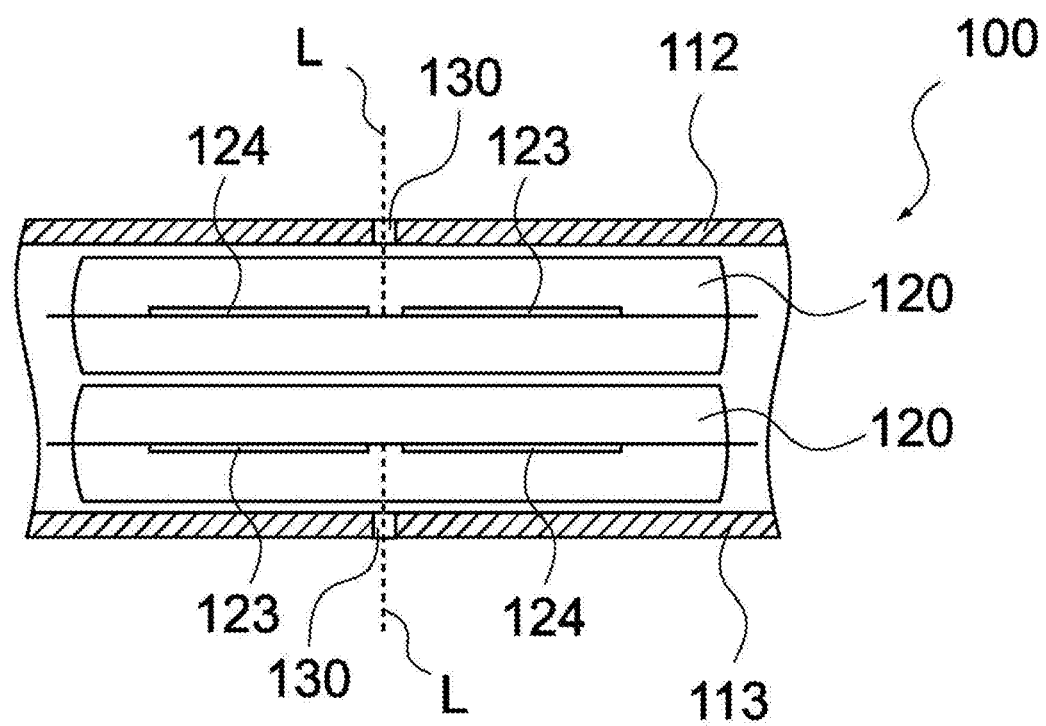
FIG. 8 is a schematic view showing the placement of a through hole in the enclosure of the electric storage module.
Figure 8:
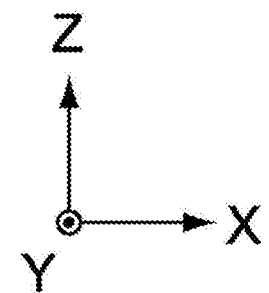

The through holes 130 are formed at positions corresponding to the parts of the electric storage cell 120 where the electric storage element 121 does not exist, or specifically, at positions facing the parts where the electric storage element 121 does not exist. FIG. 8 is a schematic view showing the position of a through hole 130. As shown in this figure, the through hole 130 is provided at a position where line L reaches the non-sealed area 122b (refer to FIG. 5), where line L represents a line passing through the through hole 130 in the direction orthogonal to the first sheet member 112 or second sheet member 113.

In particular, preferably the through holes 130 are positioned so that they reach the non-sealed area 122b (P in FIG. 5) between the positive-electrode tab 123 and the negative-electrode tab 124.

One through hole 130 is provided for, and in a manner corresponding to, each electric storage cell 120. When two sets of electric storage cells 120, where each set consists of two electric storage cells 120 stacked in the thickness direction, are housed inside the housing space R, as shown in FIG. 6, then there are two electric storage cells 120 facing the first sheet member 112, and another two facing the second sheet member 113.

As a result, two through holes 130 are provided in the first sheet member 112, and another two in the second sheet member 113. These through holes 130 are each provided at a position where line L as described above reaches the non-sealed area 122b of each electric storage cell 120.

The through holes 130 may remain exposed, or they may be covered with masking seals, etc.

[Effects of Through Holes]

If gas generates in an electric storage cell 120 due to abnormality and its internal pressure rises as a result, the electric storage cell 120 expands and a stress is applied to the enclosure 110. To disassemble this electric storage cell 120, a needle is inserted into its through hole 130 to puncture a hole in the exterior member 122. This way, the gas is released from this hole and the stress applied to the enclosure 110 disappears, and therefore the electric storage cell 120 can be disassembled safely.

Since the through holes 130 are positioned in a manner avoiding the electric storage elements 121, as described above, any internal short-circuit that would otherwise be caused by a needle inserted into a through hole 130 is also prevented. It should be noted that, although the needle to be inserted into a through hole 130 is preferably one having a flow channel formed in it, such as an injection needle, any needle may be used so long as it is sharp.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2017-185703, filed Sep. 27, 2017, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. An electric storage module, comprising:
    an electric storage cell comprising an electric storage element and an exterior body in which the electric storage element is sealed; and
    an enclosure having, inside, a housing space in which the electric storage cell is housed; wherein:
    the enclosure has a through hole which connects the housing space and an exterior of the enclosure and through which a needle can be inserted; and
    the through hole is formed at a position selected such that a straight line which passes through the through hole passes through the exterior body without passing through the electric storage element.

2. The electric storage module according to claim 1, wherein:
    the exterior body is a laminate film;
    the laminate film has a sealed area which is fused along a periphery of the electric storage element and a non-sealed area between the sealed area and the electric storage element; and
    the position at which the through hole is formed is selected such that the straight line passes through the non-sealed area.

3. The electric storage module according to claim 2, wherein:
    the electric storage cell has a positive-electrode tab which is connected to positive electrodes of the electric storage element and led out from the laminate film via the non-sealed area and the sealed area, and a negative-electrode tab which is connected to negative electrodes of the electric storage element and led out from the laminate film via the non-sealed area and the sealed area; and
    the position at which the through hole is formed is selected such that the straight line passes through the non-sealed area between the positive-electrode tab and negative-electrode tab.

4. The electric storage module according to claim 1, wherein:
    the enclosure houses multiple electric storage cells, each being the electric storage cell, in the housing space; and the enclosure has multiple through holes, each being the through hole, formed at positions selected such that straight lines which pass through the respective multiple through holes pass through the respective exterior bodies without passing through the respective electric storage elements.

5. The electric storage module according to claim 4, wherein:
the multiple electric storage cells that are housed in the housing space are stacked in a thickness direction.

* * * * *